Feb. 9, 1932.  W. STUEBING, JR  1,844,875

LIFTING TRUCK

Original Filed July 24, 1928    2 Sheets-Sheet 1

INVENTOR
William Stuebing Jr.
BY
Emery, Booth, Janney & Varney
his ATTORNEYS

Feb. 9, 1932.   W. STUEBING, JR   1,844,875
LIFTING TRUCK
Original Filed July 24, 1928   2 Sheets-Sheet 2
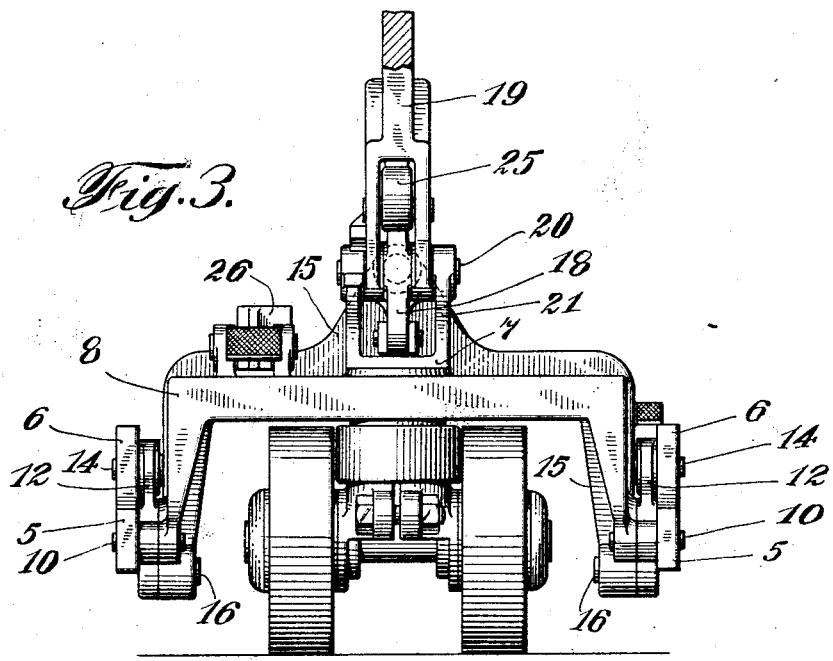
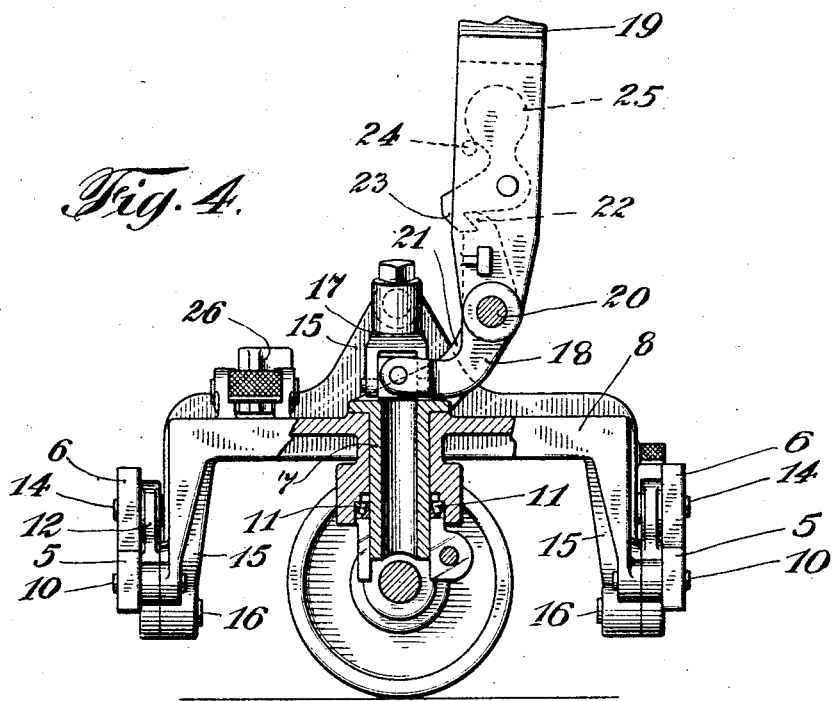
INVENTOR
William Stuebing Jr.
BY
Emery, Booth, Janney & Varney
his ATTORNEYS Patented Feb. 9, 1932

1,844,875

UNITED STATES PATENT OFFICE

WILLIAM STUEBING, JR., OF CINCINNATI, OHIO, ASSIGNOR, BY MESNE ASSIGNMENTS, TO THE YALE & TOWNE MANUFACTURING COMPANY, OF STAMFORD, CONNECTICUT, A CORPORATION OF CONNECTICUT

LIFTING TRUCK

Application filed July 24, 1928, Serial No. 295,004. Renewed November 11, 1930.

The present invention relates to lifting trucks of the type in which the steering or draft tongue is made operative to lift the load and is addressed to the provision of improved lifting mechanism whereby the tongue may so operate regardless of its lateral steering position and generally to the provision of an improved side-lift truck. The construction and mode of operation of a particular illustrative embodiment thereof is shown in the accompanying drawings wherein Fig. 1 is a view in side elevation of a lifting truck embodying the invention showing the parts in the positions assumed at the end of the elevating operation;

Fig. 3 is a view in front elevation showing the parts in the same position as in Fig. 2;

Fig. 4 is a view in front elevation showing the parts in the same position as in Fig. 3, except that the steering tongue has been swung to one side and certain parts are shown in cross-section.

Figure 1:
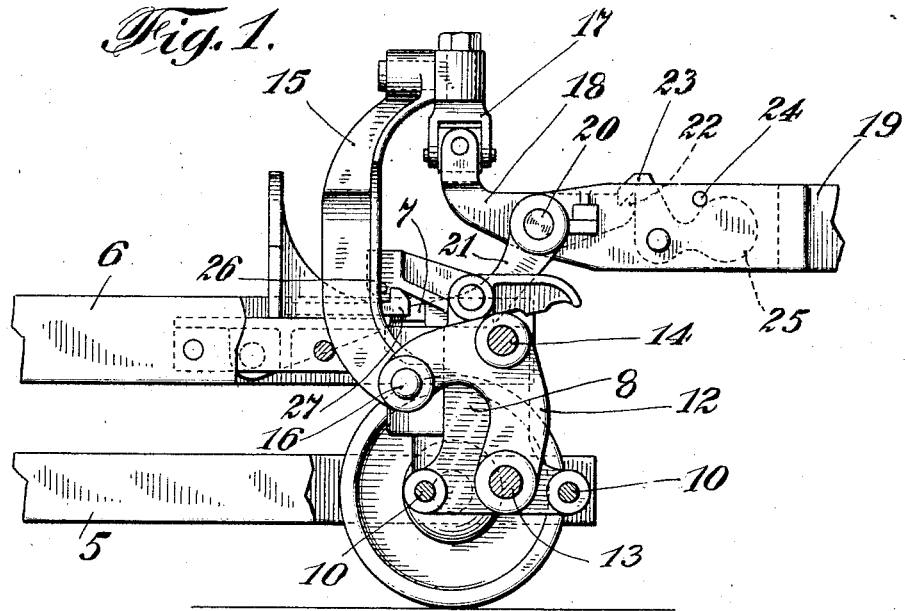

The particular truck shown in the drawings is mounted on a plurality of wheels, the front or steering wheels being the only ones illustrated.

The wheels are suitably mounted in a main frame 5 which carries above it a load-supporting elevating frame 6. Rotatably mounted at the forward end of the main frame a steering head 7 is vertically positioned to turn in a transverse yoke 8 which forms a part of the main frame 5, being attached thereto by bolts 10.

As best seen in Fig. 4, the swiveled steering head is centered in roller bearings 11 arranged to sustain both vertical and lateral stresses.

The forward end of the elevating frame 6 is connected to the main frame at each side of the truck by means of links 12 pivotally connected to the main frame and to the elevating frame by bolts or other suitable pivot members 13 and 14. The links 12 are provided with extensions to which are pivotally connected at points 16 the spaced lower ends of a link in the form of a yoke 15 which extends above and transversely of the truck frames and is provided at its upper end with means for connection with the steering tongue 19.

The connection at the upper end of the yoke 15 comprises a universal joint 17 which connects with the arm 18 which is mounted to swing in a vertical plane around the pivot 20 integral with the extension 21 of the steering head 7.

Figure 2:
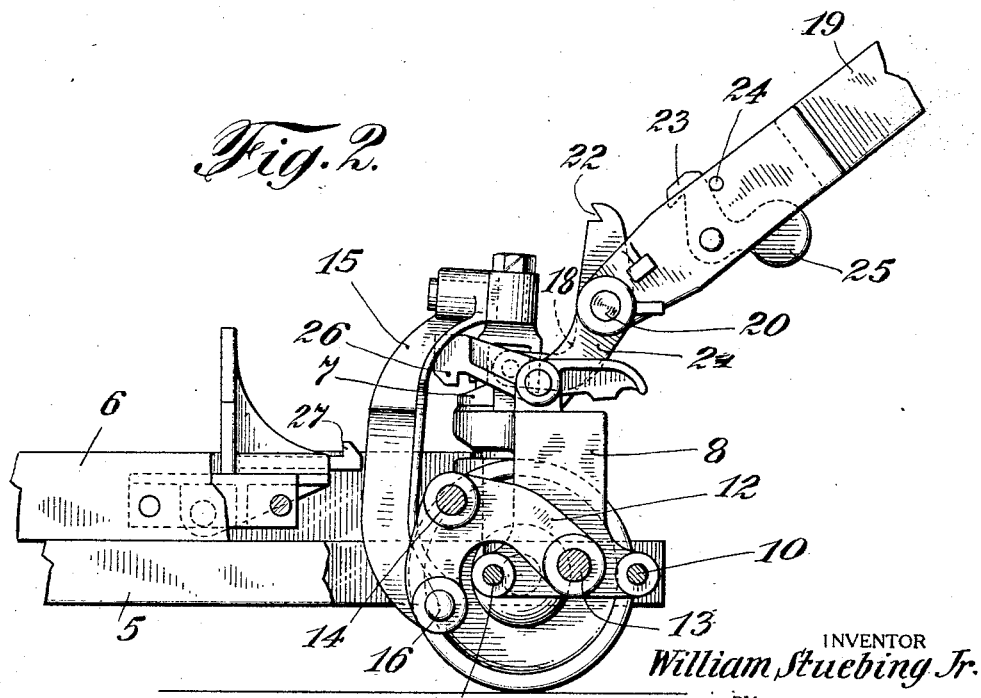
Fig. 2 is a similar view but showing the elevating frame in its lowered position and the draft tongue so detached from associated parts as to be inoperative for lifting purposes.

As best shown in Figs. 2 and 4, when the elevating frame 6 is in its lower position the arm 18 lies in a generally vertical position, in which position its upper end may be observed to have a notch 22 shaped to receive the free end of the counter-weighted hook 23 which is pivoted for limited movement upon the steering tongue 19.

The steering tongue 19 is pivoted upon the extension 21 on the steering head 7, concentrically with the arm 18, so that as the steering tongue 19 is swung to its upright position the counter-weighted hook 23 will ride over the upper end of the arm 18 and engage the notch 22.

The proper engagement of the counter-weighted hook 23 with the notch 22 is assured by the location upon the steering tongue 19 of the limiting pin 24 which prevents the hook from turning in a clockwise direction beyond the position in which it is shown in Fig. 2. This limitation of the movement of the hook enables the counter-weight 25, integral with the hook, to rotate the latter into engagement with the notch 22 when the tongue 19 is thrown smartly into its upright position.

Once the hook 23 has engaged the notch 22, the steering tongue 19 may be swung downwardly, turning the arm 18 about its pivot 20 and so elevating the yoke 15, which, in turn, causes the links 12 to swing about their pivots and to raise the elevating frame 6 upwardly and longitudinally, the universal connection between the arm 18 and the yoke 15 permitting this raising operation to be performed regardless of the lateral steering position of the tongue 19 which, as already indicated, is free to swing not only in vertical planes but also to be turned laterally to rotate the steering post 7 to steer the truck.

Fig. 1 shows the parts in elevated position, in which position the elevating frame 6 is held against undesired lowering movement by means of a latch 26 pivoted upon any suitable portion of the main frame and provided with an extension convenient for operation by the foot of the operative. When the parts are in the position shown in Fig. 1, the latch 26 engages with the hook 27 fixed to the elevating frame 6.

A slight upward movement of the tongue 19 from the position shown in Fig. 1 will allow the counter-weight 25 to turn the hook 23 out of engagement with the arm 18, so that an accidental release of the latch 26 and the consequent descent of the elevating frame 6, with its load, will not result in a sudden upward throw of the tongue 19 to the possible injury of the operative.

Further provision for the slow and safe descent of the elevating frame 6 from its upper to its lower position may be made by interposing a usual hydraulic check (not shown) between the elevating frame and the main frame.

In operation, when the truck has been positioned beneath its load and it is desired to lift the load, it is only necessary to throw the steering tongue to its vertical position to effect the automatic connection of the lifting elements with the tongue; and when the load has been elevated, a slight return movement of the tongue 19 automatically disconnects the parts, not only for the purpose above mentioned, but also to permit the elevating platform and its load to be subsequently released for descent without in any way affecting the steering tongue.

The foregoing description of a particular embodiment of the invention is for the purpose of illustration only and is not intended as defining the limits of the invention.

Claims:

1. A lifting truck comprising a main frame, an elevating frame mounted thereon, links supporting the elevating frame on said main frame, a steering and lifting tongue pivotally mounted on said main frame, frame elevating means operatively connected to said links and adapted to be actuated by said tongue, and means to connect said tongue to said frame elevating means including a latch mounted to move automatically into operative connecting position when said tongue is moved to upright position and to move automatically out of operative connecting position when said tongue is moved upwardly from a lower position.

2. A lifting truck comprising a main frame, a steering and lifting tongue pivotally mounted thereon, an elevating frame, a member bearing at one point upon the elevating frame and at another point upon the main frame, an elevating member bearing at one point upon said first-mentioned member, an intermediate member adapted to engage said elevating member at usual steering positions of said tongue, and means for automatically connecting said intermediate member for lifting movement with said tongue when the latter is moved to its operative position.

3. A lifting truck comprising a main frame, a steering and lifting tongue pivotally mounted thereon, an elevating frame, a member bearing at one point upon the elevating frame and at another point upon the main frame, an elevating member bearing at one point upon said first-mentioned member, an intermediate member adapted to engage said elevating member at usual steering positions of the steering tongue, means for connecting the said intermediate member with said tongue, and means for automatically effecting disconnection of said intermediate member from said tongue when the latter is moved upwardly from a lower position.

4. A lifting truck comprising a main frame, a steering and lifting tongue pivotally mounted thereon, an elevating frame mounted on said main frame, a member bearing at one point upon the elevating frame and at another point upon the main frame, elevating means having one portion connected to said member and another portion connected to said tongue at usual steering positions thereof, and means for automatically connecting said elevating means for lifting movement with said tongue when said tongue is moved to its upright position and for automatically disconnecting said elevating means when the tongue is moved upwardly from a lower position.

5. A lifting truck comprising a main frame, a steering wheel pivotally mounted thereon, a steering and lifting tongue operatively connected to said steering wheel, an elevating frame, a unitary lever mounted upon said main frame for raising said elevating frame, an elevating member connected to said lever, another lever connected by a universal joint to said elevating member, and means operative in any usual lateral position of said tongue to automatically disconnect said second-mentioned lever from lifting engagement with said tongue by an upward movement of the latter and to automatically connect said second-mentioned lever with said tongue when the latter is moved to upright position.

6. A lifting truck comprising a main frame, a steering wheel pivotally mounted thereon, an elevating frame, a steering and lifting tongue operatively connected with said steering wheel, a lever operatively connected with said steering wheel, an elevating member connected by a universal joint to said lever, a unitary member pivotally connected to said elevating frame and to said elevating member, and means operative between said tongue and said lever to effect lifting connection and disconnection therebetween in any steering position of said tongue.

7. A lifting truck comprising a main frame, an elevating frame mounted thereon, a steering and lifting tongue pivotally connected with said main frame, a link operatively interposed between said main frame and said elevating frame, a second link pivotally connected to said first-mentioned link, a lever mounted for lateral movement with said tongue, a universal joint connection between said lever and said second-mentioned link, and means for automatically connecting said lever with and disconnecting said lever from operative lifting relation to said tongue.

8. A lifting truck comprising a main frame, an elevating frame mounted thereon, a steering head in said main frame, a steering and lifting tongue pivotally connected to said steering head, a system of levers operatively associated with said main and elevating frames and operable to lift said elevating frame, a lifting lever pivoted on said steering head and universally operatively connected with a lever of said lever system, and means interconnecting said lifting tongue and lifting lever at the will of the operator whereby operation of said tongue will elevate said elevating frame.

9. A lifting truck comprising a main frame, an elevating frame, a steering head mounted on the main frame, a steering and lifting tongue operatively connected to said head, a lever operatively connected to said head, a system of levers interconnecting said main and elevating frames and actuable to lift said elevating frame, means universally connecting said system for operation by said lever in any position of the steering head, and means for automatically connecting said lever with and disconnecting it from said steering tongue.

In testimony whereof, I have signed my name to this specification this 17th day of July, 1928.

WILLIAM STUEBING, Jr.